United States Patent
Tasaka et al.

[11] Patent Number: 6,150,974
[45] Date of Patent: Nov. 21, 2000

[54] INFRARED TRANSPARENT RADAR ANTENNA

[75] Inventors: Toshio Tasaka, Alexandria, Va.; Harold R. Riedl, Adelphi; James B. Restorff, Berwyn Heights, both of Md.

[73] Assignee: The United States of America as represented by the Secretary of the Navy, Washington, D.C.

[21] Appl. No.: 06/380,807

[22] Filed: May 17, 1982

[51] Int. Cl.[7] .................. F41G 7/00; G01J 5/02; G01S 13/00
[52] U.S. Cl. .......... 342/53; 244/3.16; 244/3.19; 250/339.05; 343/700 MS
[58] Field of Search .......... 343/6 ND, 700 MS; 250/339, 339.05; 244/3.16, 3.19; 342/53

[56] References Cited

U.S. PATENT DOCUMENTS

| | | |
|---|---|---|
| 2,700,323 | 1/1955 | Schroder . |
| 2,972,743 | 2/1961 | Svensson et al. .............. 343/6 ND |
| 3,056,958 | 10/1962 | Anderson .............................. 250/339 |
| 3,165,749 | 1/1965 | Cushner . |
| 3,911,433 | 10/1975 | Redman .............................. 343/6 ND |
| 3,962,578 | 6/1976 | Roschen .............................. 250/339 |
| 4,108,400 | 8/1978 | Groutage et al. .................. 244/3.16 |
| 4,264,907 | 4/1981 | Durand, Jr. et al. .............. 244/3.16 |

*Primary Examiner*—Stephen C. Buczinski

[57] ABSTRACT

A dual mode missile seeker system utilizing an infrared transparent radar antenna is disclosed. The infrared transparent radar antenna is mounted in front of and on the same axis as the infrared detector within a missile dome. The radar antenna includes spaced apart patches of infrared transparent semiconductor material and a ground plane of the same material deposited on opposite sides of an infrared and microwave transparent dielectric substrate for transmitting and receiving microwave radiation and for shielding the infrared detector array mounted behind. A radome or separate lens redirects incoming infrared radiation so as to pass through the radar antenna and focus on the infrared detector array.

10 Claims, 1 Drawing Sheet

6,150,974

INFRARED TRANSPARENT RADAR ANTENNA

BACKGROUND OF THE INVENTION

This invention relates to dual mode seeker systems employed in air craft and missiles for detecting and guiding the missile or air craft toward a target. More particularly the invention relates to a dual mode seeker system utilizing a microwave antenna that is transparent to infrared radiation allowing the infrared and radar modes of the system to occupy the same central axis of the missile or air craft.

Dual mode seeker systems include an infrared detection system to detect infrared radiation emitted from the target object and a radar system, including a microwave receiver and/or generator to passively detect microwave radiation emitted from the target, or actively detect a target by radiating microwave radiation and detecting waves reflected from the target. In general, infrared detecting systems are particularly well adapted to determine the direction that the target lies from the missile or air craft using the system. While radar systems can also determine the distance that the target lies from the missile or air craft, under particular conditions, such as increased cloud cover, infrared detection systems may become inoperative or decrease in their ability to perform properly, and the seeker system must rely on the microwave system exclusively until the missile becomes close to the target where terminal guidance is provided by the infrared system.

It is therefore highly desirable to employ both detection systems in the missile seeker system. Heretofore dual mode seeker systems have required mounting the two systems on different centerlines displaced from one another. This is so because microwaves of the radar system are known to interfere with infrared detectors, and because radar antennas must be metallic, and therefore are opaque to infrared radiation, they would have to be mounted behind any infrared detector. It can be seen that mounting the radar antenna behind the infrared detector allows microwave radiation to pass through the infrared detector jamming it. If the radar antenna is mounted in front of the infrared detector, infrared radiation is blocked from reaching the detector. Mounting the radar antenna off of the axis of the infrared detector usually requires mounting the antenna outside of the radome and increases the system physical and electronic complexity, weight and cost. It can be appreciated that it is highly desirable to be able to provide for a dual mode missile seeker system that has the radar antenna and infrared detector mounted on the central axis of the radome. Such systems have been devised, such as that disclosed in U.S. Pat. No. 3,165,749 for Microwave Transmissive Optical Radiation Reflectors to S.H. Cushner. While these systems are operationally satisfactory, they are optically complex requiring optical lenses and filters and critical alignment thereof.

SUMMARY OF THE INVENTION

It is an object of the invention to provide for a simplified dual mode missile seeker system.

It is another object of the invention to provide for a dual mode missile seeker system that has the infrared detector and radar antenna mounted on the same central axis of the radome of a missile or air craft utilizing the system.

Another object of the invention is to provide for the mounting of the radar antenna of the radar detection system in front of and on the same axis as the infrared detector without adversely affecting the operation of the infrared detector.

A further object of the invention is to provide for the shielding of the infrared detector in a dual mode seeker system from jamming by electromagnetic radiation outside of the detectors frequency detection band.

Other objects and many attendant advantages will be readily appreciated as the subject invention becomes better understood by reference to the detailed description, when considered in conjunction with the accompanying drawings.

The objects of the invention are achieved and the shortcomings of the prior art are overcome by providing for a microwave antenna that is substantially transparent to infrared radiation in the 3 to 5 micron wavelength range in front of the infrared detector. The antenna and infrared detector are mounted on the central axis of the missile or air craft radome. The antenna functions as a radar antenna by radiating and receiving reflected radar radiation and also passively detects microwave radiation given off by a distance target. The antenna simultaneously allows infrared radiation in the 3 to 5 micron range to pass through to the infrared detector. The antenna also function to prevent jamming of the infrared detector by shielding the detector from both microwave radiation and infrared radiation outside of the 3 to 5 micron range. A radome lens of infrared and microwave transparent material focuses the incoming infrared radiation onto the infrared detector. The radar antenna comprises a dielectric material completely covered on one side with a thin film of semi-conductor material, preferably tin telluride, exhibiting infrared transparent properties to form a ground plane. Thin film spaced apart patches of the same semiconductor infrared transparent material are deposited on the opposite side of the dielectric. The patches and ground plane are electrically coupled to a microwave generator/receiver which pulses the patches at the desired frequency causing energy to radiate therefrom.

DETAILED DESCRIPTION OF THE PREFERRED EMBODIMENT

In the detailed description to follow the term infrared radiation refers to electromagnetic radiation that has a wavelength in the general range of 1–15 microns and more specifically to radiation that falls within the range 3–5 microns.

It is the 3–5 micron wavelength range that is commonly associated with infrared detectors in missile detection systems. The preferred material for use in this invention has been found to be substantially transparent to infrared radiation in the 3–5 micron range, however other materials, transparent in other infrared wavelength ranges, are to be considered within the scope of the invention.

The terms microwave radiation and radar, when referred to, are to be considered to be electromagnetic radiation generated by well known electronic oscillator circuits. While microwave radiation having a wavelength less than 1 cm is to be considered within the scope of this invention, the antenna of the preferred embodiment described herein generates and receives microwave radiation in the 1–3 cm wavelength range.

Figure 1:
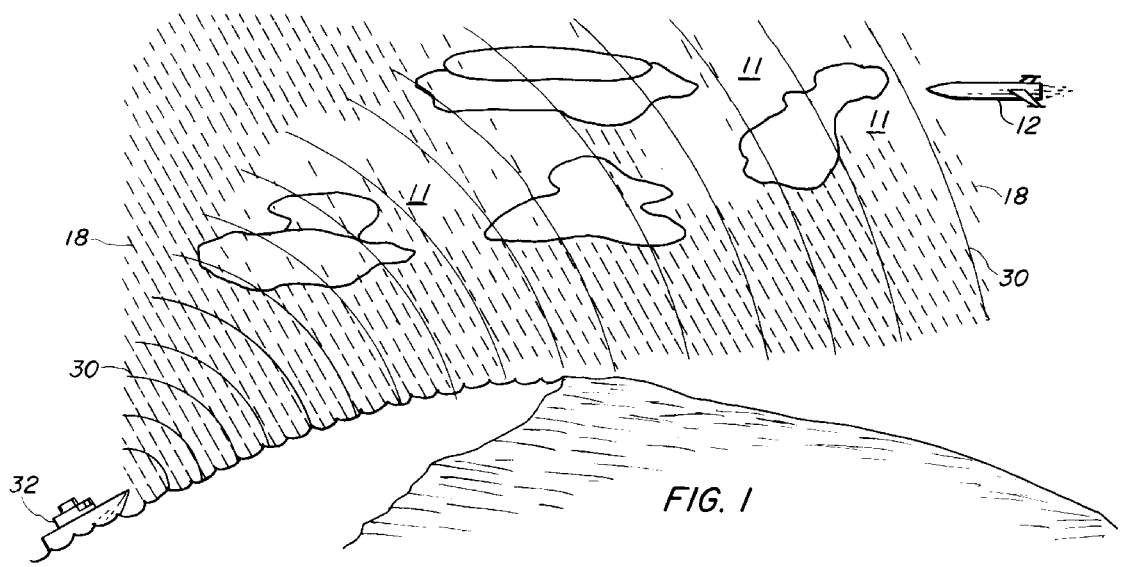
FIG. 1 is a diagramatic representation of a missile employing the invention to passively detect a target.
Figure 2:
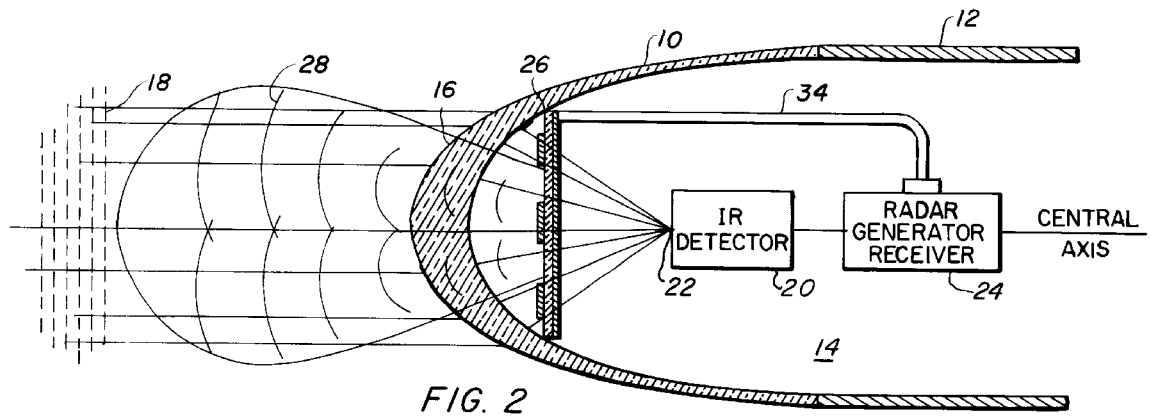
FIG. 2 is a vertical longitudinal cross sectional view of a missile dome showing in schematic and block diagram form the invention in use.

FIG. 2 shows a radome 10 attached to the forward end of a missile or air craft body 12 forming a cavity 14 known as a missile dome. The dome is symetrically located about the central axis of the missile. Radome 10 is formed at its forward end into a lens 16 for focusing incoming infrared radiation 18 onto an infrared detector, or detector array, 20. Alternatively, a separate infrared and microwave transparent infrared focusing lens, not shown, may be mounted between the infrared detector 20 and radome 10 eliminating the need to adapt radome 10 into a focusing lens. Infrared detector 20 is located within missile dome 14 on the central axis of the missile at the focal point 22 of lens 16. Radome 10 and lens 16 are made of infrared and microwave transparent material, preferably synthetic zinc selenide. Infrared detector array 20 and focusing lens 16 make up the infrared detection system mode of the dual mode system. A radar generator/receiver 24 and infrared transparent strip line radar antenna 26, to be fully described hereinafter, make up the radar detection system mode. Radar generator/receiver 24 is mounted behind infrared detector array 20 on the central axis of the missile thus simplifying the system as heretofore set out. Radar antenna 26 is mounted physically in front of infrared detector array 20, and is mounted far enough away from the local plane of the optical system so as not to interfere with the operation of detector array 20 as hereinafter set out. Antenna 26 radiates radar waves 28, see FIG. 2, generated by radar generator 24. The antenna also receives incoming radar waves 30, see FIG. 1, generated by a target 32, and reflected radar waves, not shown. Radar antenna 26 is electrically connected to generator/receiver 24 by electrical cable 34. Cable 34 includes wires for connecting antenna 26 to generator/receiver 24.

Figure 3:
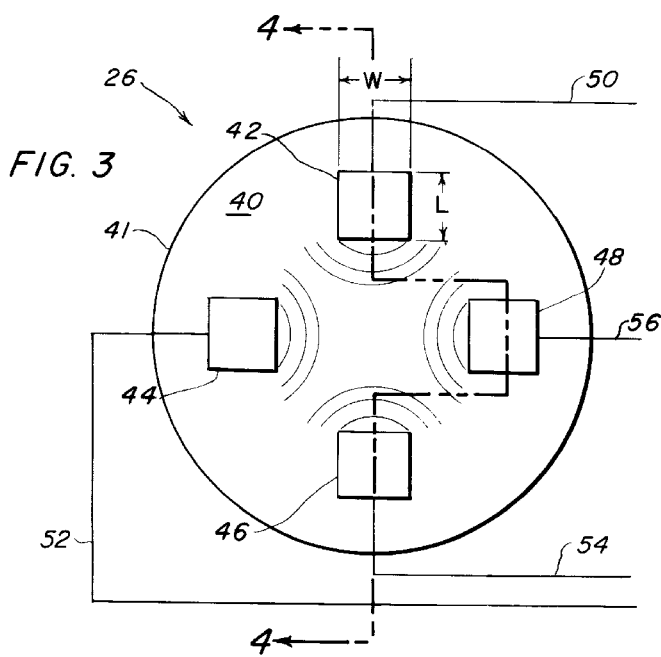
FIG. 3 is a front view of the preferred embodiment of the radar antenna of the invention.
Figure 4:
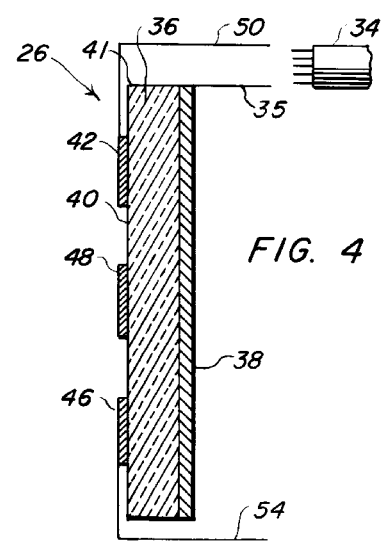
FIG. 4 is a cross sectional view through A—A of FIG. 3 showing details of construction of the preferred embodiment of the radar antenna of the invention.

As best shown in FIGS. 3 and 4, strip line radar antenna 26 includes an infrared transparent dielectric substrate 36, such as synthetic sapphire having a ground plane 38 of a thin film of semiconductor material, $Sn_xPb_{1-x}Te$, where x varies from 0 to 1, vacuum deposited on and completely covering one surface. The preferred material is SnTe because it has been found to be approximately 70% transparent to infrared radiation in the 3 to 5 micron region and can be made with an electrical resistivity not exceeding 10 ohms/sq. Another semi-conductor alloy suitable for ground plane 38 is GeTe. Ground plane material 38 must be in the non-amorphous crystalline or polycrystalline form. Four patches, 42, 44, 46, 48 of the same semiconductor material, and of the same thin film thickness, as ground plane 38 are vacuum deposited in spaced apart relationship onto the opposite surface 40 of dielectric 36.

The patches and ground plane must have as low a resistivity as possible to function properly as a radar antenna. Preferably the resistance per square should not exceed 10 ohms/sq. The thickness of the patches and ground plane are chosen according to optical interference and resistance per square considerations, so as to optimize the infrared transparency and microwave characteristics of the antenna. Electrical lead wires 50, 52, 54, 56 connect respectively to patches 42, 44, 46, 48 and couple the patches to the radar generator/receiver. Electrical wire 35, FIG. 4, connects to ground plane 38 and electrically couples the ground plane to the radar generator/receiver.

FIG. 3 shows four patches of the preferred material. The exact number of patches to be used depends on certain tradeoffs involving the efficiency of the resulting radar antenna and the antennas ability to simultaneously pass infrared radiation. An increased number of patches on surface 40 will increase the sensitivity and ability to function as a radar antenna while reducing the infrared detection ability of the infrared detector. This is so because the preferred semiconductor material is approximately 70% transparent to infrared energy, and increasing the number of patches, reduces the transmittance of infrared radiation. Therefore, to maintain an acceptable level of infrared detection and radar function, the number of patches is adjusted accordingly.

Additionally, it has been found that the length L of each patch, as measured in the direction of a line extending from the central axis of the antenna to the outer surface 41 of the antenna, shown in FIG. 3, and the width W are important parameters to consider. In general, length L determines the frequency that will radiate from the antenna. Length L has been found to be equal to approximately ½ the desired wavelength. For a typical radar detection system operating in the 1 to 3 cm range, the length of each patch would be in the range of ½ cm to 1 ½ cm. and preferably ½ cm to 1 cm. The thickness of dielectric 36, the wavelength, shape of the patch, and dielectric constant of the dielectric material are all interrelated and in general, for a desired wavelength, the patch shape would be determined first. Knowing the patch shape, a dielectric having a known dielectric constant is chosen. The required dielectric thickness is then determined. Those skilled in the field of strip line antennas can readily chose appropriate dielectric materials and thicknesses knowing the desired operational wavelength and patch geometry.

When the patches are electrically pulsed by generator 24, what is known in the art as a cavity resonator is created by the ground plane, dielectric and each patch causing microwave radiation to emerge across width W of each patch as shown in FIG. 3. The emerging radiation is electronically phased and directed to radiate outwardly from antenna 26.

The preferred patch and ground plane material, tin telluride, blocks all electromagnetic radiation in the visible light, ultraviolet light, far infrared radiation, near infrared radiation, far microwave radiation and, as heretofore mentioned, transmits approximately 70% of infrared radiation in the 3–5 micron band. Because the material is deposited in patches, less infrared radiation will pass through the antenna at the patches than at the spaces and could cast shadows on the detector. Antenna 26 must be located optically so as not to cause individual images of the patches to be focused on the infrared detector. Antenna 26 must be located far enough away from focal plane 22, and close enough to lens 16 so as to cause a uniform attenuation radiation at the detector focal plane 22.

PREFERRED MODE OF OPERATION

In operation, missile 12 is launched, or an air craft is otherwise in flight, containing the dual mode seeker system described hereinabove. In FIG. 1, ship 32 emits infrared radiation 18 and microwave radiation 30. In the situation depicted, the seeker system is passively detecting the radiation, but could also send out and receive reflected radar waves. In situations having increased cloud cover infrared radiation 18 may be weak at the missile, as shown in FIG. 1 as area 11, and detection of target 32 would rely principally on detecting radar waves 30. When the missile gets close to the target, accurate terminal guidance would be provided by the infrared mode having the benefit of increased intensity of infrared radiation 18.

Infrared radiation 18 passes through, and is focused by, lens 16 onto detector array 20, and microwave radiation passes through lens 16 and causes radar antenna 26 to send electrical signals to generator/receiver 24. It can be seen that microwave radiation can not reach infrared detector 20 because the continuous thin film ground plane acts as shield to block their passage. Consequently, radar waves not detected by patches 42, 44, 46, 48 will not interfer with infrared detector array 20. Infrared radiation 18 is able to reach detector array 20 because radar antenna 26 is substantially transparent to infrared radiation. Having described the invention, other modifications and embodiments will come to the mind of one skilled in the art having the benefit of the teachings presented in the foregoing description and drawings. It is therefore to be understood that this invention is not limited thereto and that said modifications and embodiments are to be included within the scope of the appended claims.

What is claimed as new and secured by Letters Patent of the United States is:

1. An infrared transparent, microwave radiation radiating and receiving antenna comprising:
   a substrate of infrared transparent dielectric material having two opposing surfaces;
   a ground plane of semiconductor material transparent to infrared radiation within a preselected frequency band deposited as a thin film on one of the opposing surfaces, said ground plane adapted to block all incoming electromagnetic radiation outside of the preselected frequency band;
   a plurality of patches of the same semiconductor material as said ground plane material deposited in spaced apart relationship on the second of the opposing surfaces and being the same thickness as said ground plane, said patches adapted to be electrically pulsed for radiating microwave radiation outwardly from the antenna, said patches further adapted to receive incoming microwave radiation and generate an electrical signal in response thereto.

2. The antenna as defined in claim 1 wherein the infrared transparent semiconductor ground plane and patch material is $Sn_xPb_{x-1}Te$, where x varies from 0 to 1.

3. The antenna as defined in claim 1 wherein the infrared transparent semiconductor ground plane and patch material is SnTe.

4. The antenna as defined in claim 1 wherein the infrared transparent semiconductor ground plane and patch material is GeTe.

5. The antenna as defined in claim 1 wherein the semiconductor material is transparent to infrared radiation in the frequency band 3 to 5 microns.

6. A dual mode seeker system for mounting on the central axis of a missile dome for detecting distant objects by detecting infrared and microwave radiation given off by or reflected from the object comprising:
   means for detecting infrared radiation within a preselected frequency band mounted on the central axis of the missile dome;
   means for focusing the infrared radiation onto said infrared detecting means, said focusing means mounted on the central axis of the missile dome and transparent to microwave radiation;
   a microwave antenna transparent to infrared radiation within the preselected frequency band mounted on the central axis of the missile dome between said detector means and said focusing means, said antenna adapted to radiate microwave radiation outwardly when electrically pulsed and to send electrical signals when receiving incoming microwave radiation, said antenna also adapted to block all incoming electromagnetic radiation having a frequency outside of the preselected infrared transparent frequency band for shielding said infrared detection means from being jammed;
   means for electrically pulsing said microwave antenna so that said antenna radiates microwave radiation outwardly and for receiving electrical signals sent from said antenna in response to incoming microwave radiation;
   whereby the distant object giving off microwave radiation or infrared radiation within the preselected infrared transparent frequency band or reflecting microwave radiation radiated from said antenna is detected.

7. The dual mode seeker system as defined in claim 6 wherein said means for focusing infrared radiation includes a lens.

8. The dual mode seeker system as defined in claim 6 wherein said means for focusing infrared radiation is a radome.

9. The dual mode seeker system as defined in claim 6 wherein said microwave antenna is transparent to infrared radiation in the frequency band 3 to 5 microns.

10. The dual mode seeker system as defined in claim 6 wherein said means for pulsing said antenna and for receiving electrical signals from said antenna includes a microwave generator receiver electrically coupled to said antenna.

* * * * *